United States Patent [19]

Bowling

[11] Patent Number: 5,719,656
[45] Date of Patent: Feb. 17, 1998

[54] CONTACT LENS UTILIZING STILES-CRAWFORD EFFECT

[76] Inventor: Patricia J. Bowling, 1485 Red Rock, Las Vegas, Nev. 89102

[21] Appl. No.: 446,169

[22] Filed: May 19, 1995

[51] Int. Cl.$^6$ .................................................. G02C 7/04
[52] U.S. Cl. ................... 351/160 R; 351/160 H; 351/161
[58] Field of Search ............... 351/160 R, 160 H, 351/161, 162, 177

[56] References Cited

U.S. PATENT DOCUMENTS

| | | | |
|---|---|---|---|
| 4,208,365 | 6/1980 | LeFevre | 264/1 |
| 4,573,774 | 3/1986 | Sitterle | 351/160 H |
| 4,580,882 | 4/1986 | Nuchman | 351/161 |
| 4,618,227 | 10/1986 | Nayshore | 351/161 |
| 4,815,846 | 3/1989 | Wodis | 356/124 |
| 4,994,080 | 2/1991 | Shepard | 351/162 |
| 5,009,497 | 4/1991 | Cohen | 351/161 |
| 5,076,683 | 12/1991 | Glick | 351/160 H |
| 5,125,728 | 6/1992 | Newman | 351/160 H |
| 5,260,727 | 11/1993 | Oksman et al. | 351/162 |
| 5,300,262 | 4/1994 | Glick | 264/2.1 |

FOREIGN PATENT DOCUMENTS

| | | | |
|---|---|---|---|
| 1276003 | 6/1972 | United Kingdom | 351/162 |

OTHER PUBLICATIONS

Stabell, Ulf, et al. (1977) "Wavelength Discrimination of Peripheral Cones and Its Change With Rod Intrusion", *Vision Res.* 17:423–426.

Van Loo, Joseph A., et al. (1975) "The Scotopic Stiles-Crawford Effect", *Vision Res.*, 15:1005–1009.

Stiles, W.S. (1938) "directional sensitivity of the retina and the spectral sensitivities of rods and cones", *Abstracts-Papers Communicated to The Royal Society of London*, pp. 141–142.

Stiles, W. S. (1938) "The Luminous Efficiency of Monochromatic Rays Entering the Eye Pupil at Different Points and a New Colour Effect", The National Physical Laboratory, pp. 90–118.

*Primary Examiner*—Scott J. Sugarman
*Attorney, Agent, or Firm*—Townsend and Townsend and Crew LLP

[57] ABSTRACT

The present apparatus comprises a lens body of conventional soft contact lens composition, having a generally spherical concave back surface adapted to fit the cornea of the eye, and a generally convex front surface. The lens preferably includes a prism ballast to ensure correct orientation. The lens of the present invention is made of opaque or other substances which generally do not transmit light. In the process, the eye is mapped with a conventional field test to determine the diseased portion of the eye and those portions of the eye having optical perception. Through the lens surface, circular channels or "pinholes" which traverse the entire thickness of the lens are placed in an area which maps and therefore corresponds to the portion of the retina having optical perception. Light incident on the underlying portion of the retina having optical perception through the pinholes provides improved vision. These pinholes can be made in the form of channels. Such channels further increase tear distribution under the lens with improved comfort to the wearer. The channels additionally provide increased oxygen flow to the cornea and lens, thereby diminishing the physiological burden occasioned by standard soft contact lens.

6 Claims, 1 Drawing Sheet

CONTACT LENS UTILIZING STILES-CRAWFORD EFFECT

FIELD OF THE INVENTION

This invention relates to contact lenses, and more particularly, to soft contact lenses whereby visual activity is increased by increasing the amount of light absorbed by the cones of the retina.

BACKGROUND OF THE INVENTION

The retina contains two types of photo receptors: rods and cones. In 1939, Stiles showed that light rays which strike a cone perpendicular to its surface are perceived as brighter than those that do not strike in a perpendicular fashion. See "The Luminous Efficiency of Monochromatic Rays Entering the Eye Pupil at Different Points and a New Colour Effect" by W. S. Stiles from The National Physical Laboratory, pp. 90–118, of 16 Feb., 1938. Additionally please see "The Scotopic Stiles-Crawford Effect" by Van Loo, Jr. and Enoch in *Vision Res.* Vol. 15 pp 1005–1009 1975 and Wavelength Discrimination of the Peripheral Cones and Its Change with Rod Intrusion" by Stabell and Stabell, *Vision Res.* Vol 17, pp 423–426, 1977.

To date, this effect has been primarily a clinical phenomenon. It has not been utilized for the improvement of vision.

SUMMARY OF THE INVENTION

The present apparatus comprises a lens body of conventional soft contact lens composition, having a generally spherical concave back surface adapted to fit the cornea of the eye, and a generally convex front surface. The lens preferably includes a prism ballast to ensure correct orientation. The lens of the present invention is made of opaque or other substances which generally do not transmit light. In the process, the eye is mapped with a conventional field test to determine the diseased portion of the eye and those portions of the eye having optical perception. Through the lens surface, circular channels or "pinholes" which traverse the entire thickness of the lens are placed in an area which maps and therefore corresponds to the portion of the retina having optical perception. Light incident on the underlying portion of the retina having optical perception through the pinholes provides improved vision. These pinholes can be made in the form of channels. Such channels further increase tear distribution under the lens with improved comfort to the wearer. The channels additionally provide increased oxygen flow to the cornea and lens, thereby diminishing the physiological burden occasioned by standard soft contact lens.

There are a number of individuals afflicted by retinal disease. In these individuals the total number of retinal cones has been dramatically reduced as a result of the disease process. The present invention seeks to improve the remaining visual acuity by altering the manner in which ambient light is delivered to those cones not destroyed by the disease process.

By placing a number of "holes" or channels through an opaque contact lens surface in an area on the lens which corresponds with the remaining visual field, the light passing through these holes is forced to strike the posterior retinal surface in a perpendicular manner. The physiological effect is an overall increase in visual acuity as a result of increased light reception. It is believed that this improvement is related to the so-called Stiles-Crawford Effect of the First Order.

The portion of the retina not having sufficient light sensitivity to contribute to meaningful perception is covered by the opaque portion of the lens—this portion not having the pinholes. Light is prevented from being perpendicularly incident on the diseased portions of the retina. Specular reflection of this light from the diseased retina is inhibited.

Because each person suffering from retinal disease will have a specific field defect unique to their own process, the lens must possess a means by which to maintain axial orientation thereby insuring that the opacified portion of the lens does not occlude the remaining visual field. This is conventionally done with a prism to bias the lens and prevent lens rotation.

DESCRIPTION OF THE PREFERRED EMBODIMENT

Figure 1:
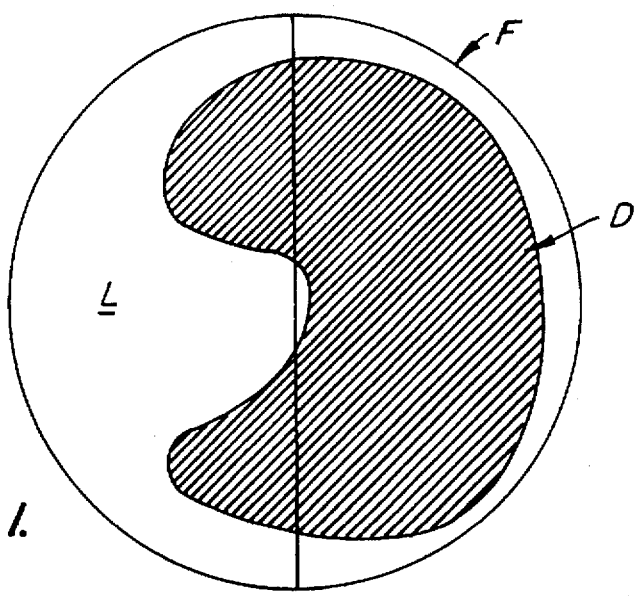
FIG. 1 shows the result of conventional field testing on a diseased eye—in this case my own eye—illustrating in the shaded portion that area of the visual field which is not capable of light reception or meaningful vision.

Referring to FIG. 1, retinal field F of a patient is conventionally mapped utilizing a conventional and well known field analyzer. In this case, light insensitive portion D is insufficiently sensitive to light to have meaningful vision. This is to be contrasted with light sensitive portion L where meaningful vision can occur.

Figure 2:
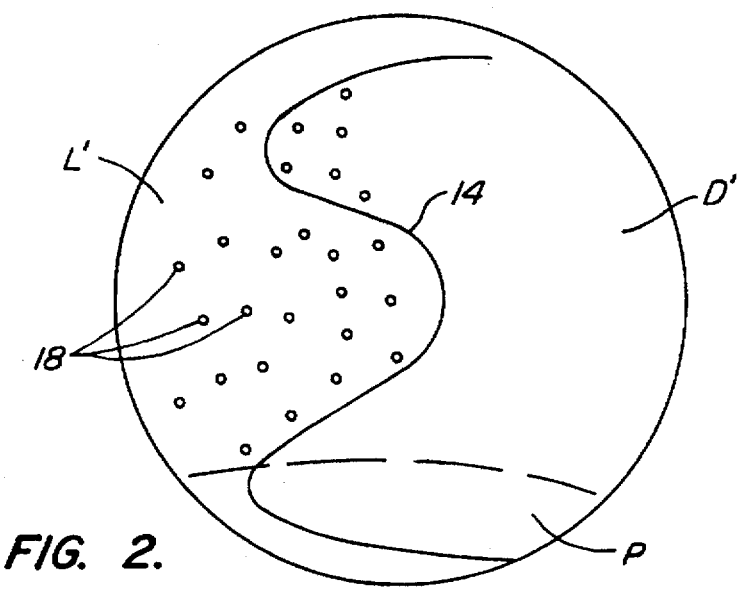
FIG. 2 is a contact lens having an opaque surface with "pinholes" placed over a mapped portion of the eye lens which corresponds to a mapped portion of the retina having visual sensitivity; and, FIG. 3 illustrates the lens of FIG. 2 on the eye of a patient.

Referring to FIG. 2, contact lens C is illustrated. It is to be understood that the entirety of contact lens C is opaque—the underlying cornea of the eye would be obscure.

Contact lens C is likewise mapped. It includes light sensitive portion L' and light insensitive portion D. Pinholes 18 are placed in an array over light sensitive portion L' of contact lens C. Contact lens C is preferably a soft contact lens. The reader will understand that it can be a hard contact lens. It is typically provided with a mechanism for biasing the lens in rotation with respect to the eye. It will be seen that contact lens C has been provided with prism P at the bottom portion of the lens. Those having skill in the contact lens art will appreciate that virtually any mechanism which biases the lens in rotation with respect to the eye could be used as well.

Preferably, pinholes 18 constitute through hole channels in the lens. Such through hole channels contribute both to tear distribution and to oxygen distribution through the lens.

Channels or "holes" 18 force light entering the pupil to strike the retina at an angle perpendicular to the back wall of the retina, thereby increasing the absorption of this light by the cones, and thereby increasing the visual acuity of the wearer.

The channels transverse the entire thickness of the lens also serve to promote and facilitate the distribution of tears around the periphery of the lens resulting in improved oxygen transport to the surface of the eye, particularly in the area of the prism ballast where lens thickness is the greatest.

It will be understood that pinholes 18 can admit of modification. It is only required that the pinholes admit light locally of the pinhole to the eye. For this reason, constructions different from through holes can be utilized. For example, the opaque covering of contact lens C can be locally interrupted at the pinhole with the otherwise transparent body of contact lens C permitting light to pass through the lens. Further, the pinholes are directionally oriented such that the light entering through the pinhole is directed toward the fovea of the eye, this area being the area of maximal concentration of cones.

Lenses of the present invention may be prepared by those skilled in the art utilizing conventional techniques for the fabrication of soft contact lenses. For example, the lenses may be lathe cut from a dehydrated lens blank or button of a hydrophilic polymer and subsequently hydrated to obtain the soft lens product. Alternatively, the lens may be molded in a hydrated state or in the presence of water or solvent to obtain a soft product. Lens compositions may be of polyhydroxyethylmethacrylate (HEMA), copolymers of HEMA and N-vinylpyrrolidone (NVP), silicone or other material known to be useful in the fabrication of soft contact lenses.

Figure 3:
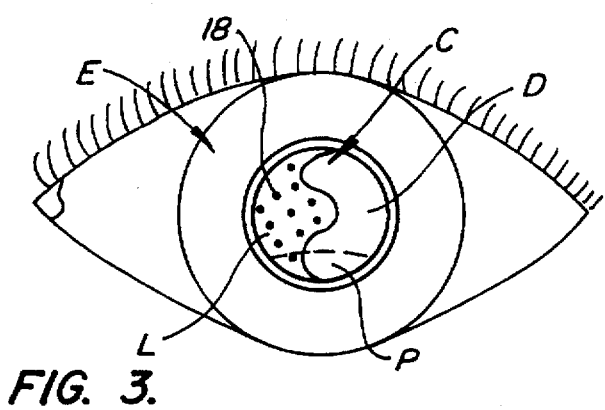

Wearing of the contact lens is otherwise conventional. Referring to FIG. 3, contact lens C is shown on eye E of a patient. It will be understood that eye E has been conventionally mapped utilizing a field test—a procedure well known in the prior art. Prism P maintain contact lens C in rotational alignment on eye E. Light insensitive portion D of contact lens C covers the cornea of the eye overlying the mapped light insensitive portion D of the eye. Conversely, pinholes 18 form an array over the mapped light sensitive portion L' of contact lens C.

Without limiting this invention, an explanation as to how operation of this invention occurs is offered.

The retina contains two types of photo receptors—rods and cones. The rods are adapted for dim light conditions (aka: scotopic vision), and transmit monochromatic light. The cones are adapted for ambient light (aka: photopic vision) and transmit color (polychromatic) images. By way of simplification, light enters the pupil, lands upon the rods and cones, and is absorbed there. As the light is absorbed, the photopigments contained in the rods and cones become (what is commonly referred to as) "bleached". This results in the transmission of a neuroimpulse from the photopigment, across the synapse to the visual cortex. When a sufficient number of the impulses are received, they are, in essence, summed, and an image is created.

In 1939, Stiles was able to document that the angle at which light strikes the cones determines the amount of light photon energy which is absorbed. More specifically, light which strikes the cones at a perpendicular angle is more readily absorbed. Thus, if as a ray of light enters the pupil it can be "bent" in such a manner that it lands on the posterior retinal surface perpendicularly, less light will be necessary to activate the cone, or putting it differently, less light will be necessary in order "to see". This is known as the Stiles-Crawford Effect of the First Kind.

The "pinhole test" is a clinical application of the Stiles-Crawford effect. Stiles is generally credited with developing the "pinhole test". If you have a full ophthalmic exam, you are given a little device which blocks one eye, and which has an opaque surface with holes covering the other eye. You are then asked to re-read the visual acuity chart.

This device restricts the angle at which light enters the pupils, resulting in the rays actually falling upon the cones in a perpendicular manner; thus, fewer photons are required, the absorption of these photons is faster (more efficient). This increase in efficiency results in an increase in visual acuity. (For most there is a slight increase in ability to read the last line.) This test, in essence, is an easy way for the examiner to ensure that any loss of visual acuity is a result of non-organic causes—e.g. garden variety nearsightedness.

For the individual without retinal disease there is sufficient number of rods and cones such that the summation of impulses occurs with photons to spare. This is not the case, however, when large portions of the retina have been functionally, if not literally, destroyed by disease.

Thus, prior to this contact lens, the only way to improve visual acuity was to increase the number of photons delivered to the remaining photopigments. This is classically done in two ways—an increase in the intensity of the light, and an increase in the size of the image (e.g. large print books) which effectively increases the number of photons reflected to the retina. An example would be the use of an architect's lamp which contains both a magnifying lens and the illuminating fluorescent bulb. The fluorescent bulb increases visual acuity by increasing the amount of light available. The magnification increases visual acuity by increasing the size of the image, thus increasing the number of photons reflected to the eye. For example, I use a magnifying "architect's" lamp for reading. The fluorescent light increases the actual quantity of light available, and the magnification of the print makes it easier for me to "fill in the gaps" in the letters, and almost approach the ability to scan a text.

In extensive testing at the Shiley Eye Clinic (Scripps) I show a marked improvement in visual acuity when using the pinhole device. For this reason, I believe that this lens is a new approach to the problem of retinal disease. If I can increase the efficiency of the remaining photopigments, i.e., I can deliver the light perpendicular to the remaining cones, then I can achieve the summation required to create a visual impulse by the visual cortex—only without having to carry a lamp and a magnifying glass.

It will be recognized by persons skilled in the art that numerous variations and modifications can be made to the present invention without departing from the overall spirit and scope of the invention as broadly described herein.

It is also to be understood that the following claims are intended to cover all of the generic and specific features of the invention herein described, and all statements of the scope of the invention which as a matter of language might be said to fall therebetween.

What is claimed is:

1. A contact lens for an eye having a diseased retina with a first portion of the retina having light perception and a second portion of the retina having insufficient light perception, the contact lens comprising:

a convex anterior surface and a concave posterior surface for fitting to the eye of the wearer;

means for biasing the contact lens in rotational alignment with respect to the eye;

means for rendering the contact lens opaque for blocking light to the retina of the eye; and, an array of pinholes overlying the first portion of the retina having light perception only to produce light entrance apertures through the opaque layer to the retina of the eye.

2. A contact lens according to claim 1 including:

an opaque layer over the contact lens.

3. A contact lens according to claim 1 including:

the pinholes constitute through holes in the contact lens.

4. A contact lens according to claim 1 including:

the means for biasing the contact lens in rotational alignment includes a prism.

5. A contact lens according to claim 1 including:

said contact lens is a hard contact lens.

6. A contact lens according to claim 1 including:

said contact lens is a soft contact lens.

* * * * *